United States Patent
Hadrava

Patent Number: 5,918,411
Date of Patent: Jul. 6, 1999

[54] PLANT PROTECTOR

[76] Inventor: Duane Hadrava, 555 Wagon Wheel Dr. SE., Bemidji, Minn. 56601

[21] Appl. No.: 08/947,229

[22] Filed: Oct. 8, 1997

Related U.S. Application Data

[60] Provisional application No. 60/041,405, Mar. 19, 1997.

[51] Int. Cl.⁶ .................................................. A01G 13/02
[52] U.S. Cl. .................................. 47/28.1; 47/23; 47/25
[58] Field of Search .................. 47/25, 27, 28.1, 47/23, 32; 119/61; 220/575, 4.22, 4.23, 4.24, 4.25

[56] References Cited

U.S. PATENT DOCUMENTS

| | | |
|---|---|---|
| D. 353,435 | 12/1994 | Bartley ........................ 47/25 X |
| 915,897 | 3/1909 | Skorness . |
| 2,782,561 | 2/1957 | Smith . |
| 2,822,644 | 2/1958 | Berger . |
| 3,005,287 | 10/1961 | Dudley . |
| 3,618,260 | 11/1971 | Convey, Jr. et al. . |
| 3,755,965 | 9/1973 | Emery ............................ 47/27 |
| 3,896,586 | 7/1975 | Caldwell ........................ 47/28.1 |
| 4,268,992 | 5/1981 | Scharf, Sr. ........................ 47/23 |
| 4,308,688 | 1/1982 | Revane ........................ 47/25 |
| 4,395,845 | 8/1983 | Markowitz ........................ 47/32 |
| 4,521,464 | 6/1985 | Chapman ........................ 428/33 |
| 4,648,203 | 3/1987 | Worzek ........................ 47/32 |
| 4,986,025 | 1/1991 | Imperial ........................ 47/2 |
| 5,367,822 | 11/1994 | Beckham ........................ 47/25 |
| 5,456,044 | 10/1995 | Parker et al. ........................ 47/27 |
| 5,711,106 | 1/1998 | Ellis ........................ 47/25 |

Primary Examiner—Jack W. Lavinder
Assistant Examiner—Yvonne R. Abbott
Attorney, Agent, or Firm—Merchant, Gould, Smith, Edell, Welter & Schmidt, P.A.

[57] ABSTRACT

A plant protector constructed and arranged to provide a protective cover on the surface of the ground around a plant, formed of two identical separate semicircular half-sections which interlock at diametrically extending center wall sections to form a bowl-like structure with an upstanding outer wall, a flat bottom with drain openings, a center opening extending into each half-section to accommodate a plant stem, and an outer skirt depending from an upper edge of the outer wall.

6 Claims, 2 Drawing Sheets

PLANT PROTECTOR

This application claims benefit of Provisional Appln. 60/041,405 filed Mar. 19, 1997.

FIELD OF THE INVENTION

This invention relates generally to devices for protecting growing plants and more particularly relates to a separable, plate-like or disc-like device which can be removably placed around the trunk or shaft of a growing plant, on the ground, to facilitate plant growth.

BACKGROUND OF THE INVENTION

A number of devices have been developed to enhance the growth of plants. For example, tomato plants are supported by wire structures positioned around the plant. Various types and colors of foil have been used to prevent weed growth and to facilitate the growth of plants such as strawberries. Collars are often placed around tree trunks to prevent damage to the bark from animals or machines. Mulching substances such as peat moss or wood chips are often placed on the ground around growing plants to keep the soil cool and hold moisture. However, many of the currently used techniques perform one or two functions quite well, but do not provide multiple advantages and are not reusable. Thus, there is a need for a reusable device which is capable of performing a number of plant protection functions and is, at the same time, easy and simple to apply and use.

SUMMARY OF THE INVENTION

The present invention provides a plate-like or disc-like device, preferably molded from plastic, generally circular in shape with an opening in the middle to accommodate a plant stem or trunk, and comprising interlocking sections so that the device can be easily placed around a plant and removed when necessary or desirable. When placed around a growing plant, this plant protector will help to control weeds because it acts as a weed barrier, helps to hold ground moisture longer because it retards evaporation from the soil around the plant, helps to generate early morning ground heat from the sun, particularly if molded from a black plastic material, and holds heat around the plant for a longer period after sunset. It also provides a basin for directing water to the plant roots and helps to direct fertilizer to a location where it does the most good for the plant. This plant protector can be made in various sizes to accommodate various kinds of plants and can be used season after season because it is removable and because it is preferably made from a durable, non-toxic plastic material. My invention is particularly useful in areas of the country which have shorter growing seasons because it helps make the most effective use of the days that are available.

DESCRIPTION OF THE PREFERRED EMBODIMENT

Figure 1:
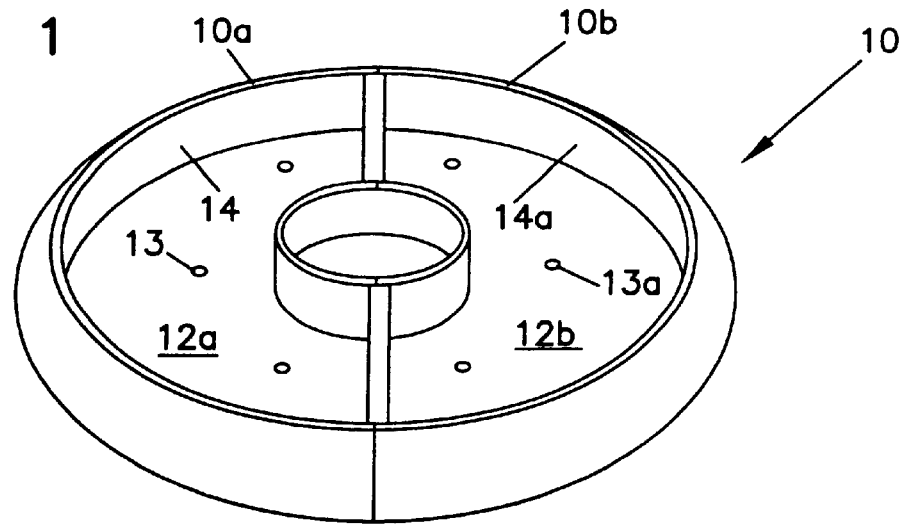
FIG. 1 is a view in perspective of a plant protector according to my invention taken from the top and one side thereof.

Referring now to the drawings, wherein like numerals are used throughout the several views to indicate like elements of the invention, there is disclosed in FIG. 1 a plant protector 10 according to my invention. Plant protector 10 is molded from a suitable plastic material and has a bowl-like configuration with a circular periphery with a hole 11 in the middle to accommodate the plant stem or trunk, and is assembled from two interlocking, identical hemispherical sections 10a, 10b. Each hemispherical section has a generally flat bottom wall portion 12a, 12b with each bottom wall portion having a plurality of drain holes 13, 13a therein. Each bottom wall portion 12a, 12b is connected at its outer periphery to a generally vertically extending side wall 14, 14a, which combine to form a circular outer wall portion for the bowl-like structure. The bottom wall portions 12a, 12b are connected to the side wall portions 14, 14a by curved bottom corner portions 15, 16.

The opposite ends of side walls 14, 14a are each connected by a diametrically extending planar wall portion 17, 18 each having formed at its center a semicircular wall portion 17a, 18a which extend into the respective bottom wall portions 12a, 12b to define opening 11 when the two sections 10a, 10b are joined.

Figure 5:
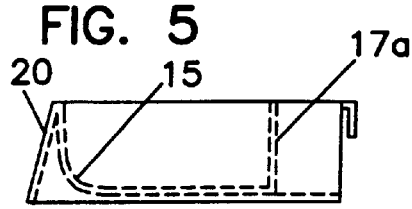
FIG. 5 is an end view from the bottom end of FIG. 3, with interior features being shown in phantom.
Figure 6:
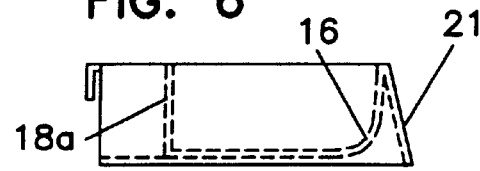
FIG. 6 is an end view from the bottom end of FIG. 4, with interior features being shown in phantom.

Each of the sections 10a, 10b is formed to have a lip 19, 20 which is generally L-shaped in cross-section as shown in FIGS. 5 and 6, and which is connected to the upper edge of a corresponding wall portion 17, 18 between the center opening 11 and the periphery of the unit. To assemble the unit, the two hemispherical sections 10a, 10b are connected with lip 20 extending over the oppositely disposed upper edge of wall portion 17 and lip 19 extending over the top edge of the oppositely disposed wall portion 18.

Figure 2:
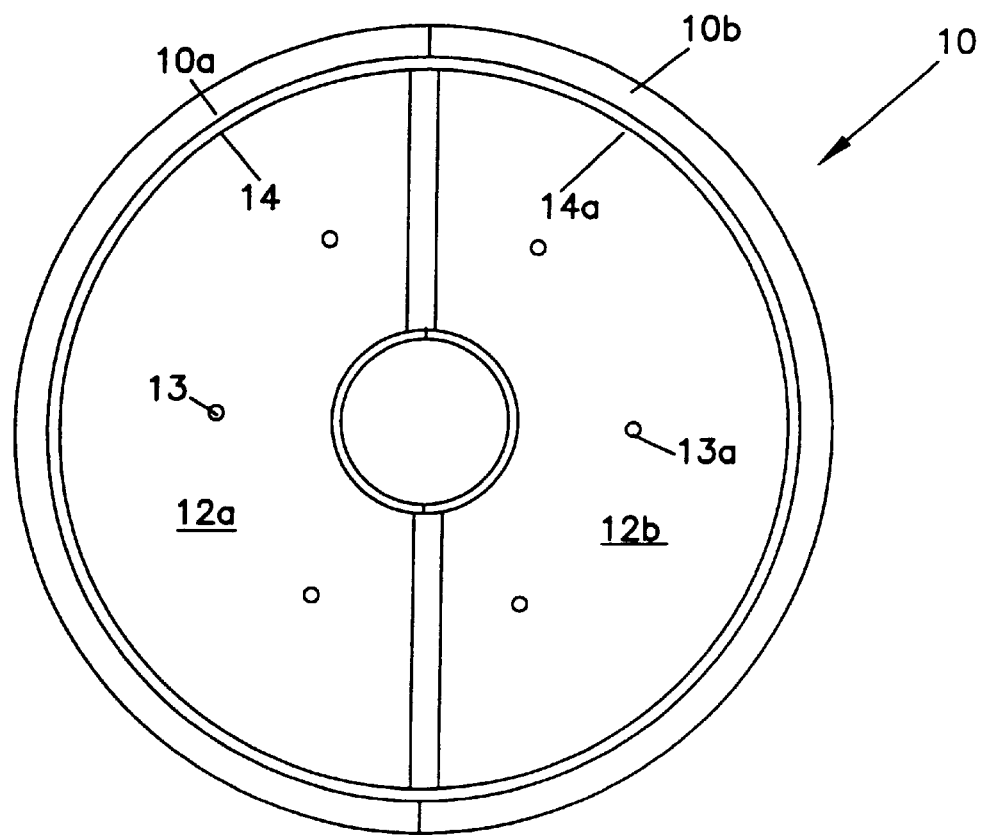
FIG. 2 is a top plan view thereof.
Figure 3:
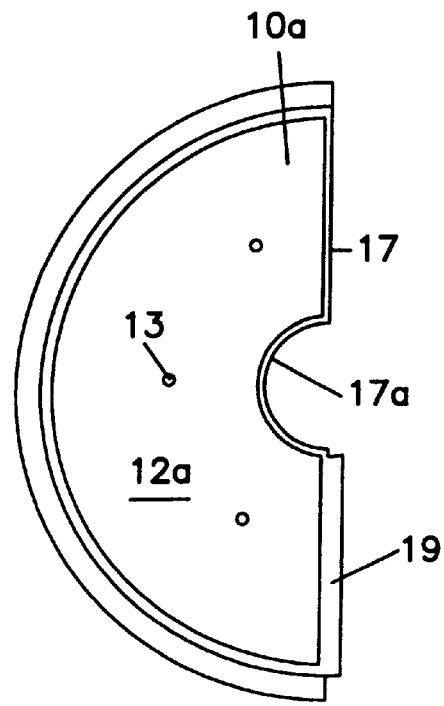
FIG. 3 is a top plan view of one hemispherical portion of the plant protector.
Figure 4:
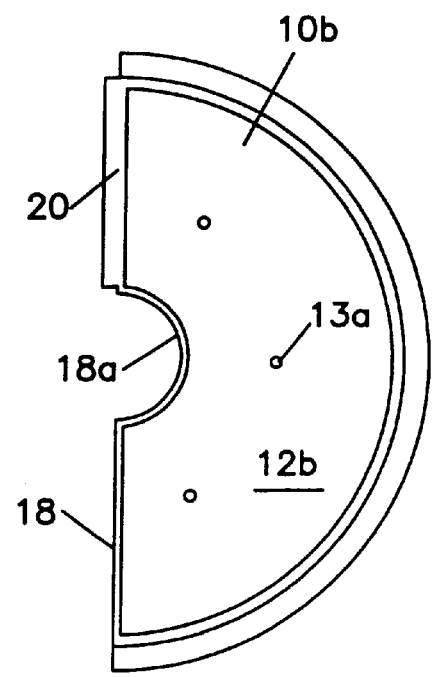
FIG. 4 is a top plan view of the other hemispherical portion of the plant protector.

Plant protector 10 further comprises a peripherally extending outer skirt 20, 21 which flares downwardly and outwardly from the upper edge of a side wall portions 14, 14a. When the two sections are joined together as shown in FIGS. 1 and 2, skirt 20, 21 defines a continuous, circular outer wall portion having a circular bottom edge extending to slightly below the plane of bottom wall portions 12a, 12b and spaced from curved portions 15, 16, which functions to engage the soil and hold the plant protector in place.

Although this plant protector can be made in different sizes, the embodiment disclosed herein is 11" in diameter at the top edge of wall portions 17, 18, and 12" in diameter at the bottom edge of skirt 20, 21. The inside depth is 2" and the diameter of hole or opening 11 is 2¼". The drain holes are ⅜" in diameter and the walls are approximately ¹⁄₁₆" thick.

Because the two sections 10a, 10b are identical, they can be molded from the same mold and any two sections can be assembled to form a plant protector as shown in FIG. 1. The sections are assembled at the side and positioned around the plant where they are interlocked together to provide the functions and advantages heretofore described. When in place, water or liquid fertilizer placed in the basin will drain through the holes 13, 13a to water and/or fertilize the plant roots. The plant protector can be left in place during the growing season and can be removed by separating the two sections, which can then be stored until they are needed again.

I claim:

1. A plant protector, comprising a generally circular, bowl-like structure having a pair of interlocking identical half-sections, wherein the interlocking identical half-sections each comprise:

a bottom wall portion having a circular outer edge, a pair of straight inner edge portions extending inward from each side of the outer edge of the half-section, and a generally circular edge portion connecting the pair of straight inner edges such that a hole is formed proximate the center of the plant protector when two half sections are connected in order to permit a plant to pass through the hole;

a circular outer wall having an outer portion and an inner portion, the inner portion connects the outer circular edge of the bottom wall portion with an upper side of the circular outer wall;

a pair of first vertical center wall sections extending upward from the bottom wall portion along the pair of inner straight edge portions; and a second vertical center wall extending upward from the bottom wall portion along the generally circular edge portion; and an interconnecting lip coupled to a top edge of one of said first vertical center wall sections of each half-section, the interconnecting lip being constructed and arranged to extend over an adjacent upper edge of a first center wall section on the other of said half-sections to interlock them together.

2. A plant protector according to claim 1 wherein the first vertical center wall sections are coupled to the circular outer wall at the circular outer edge of the bottom wall portion, and the first vertical center wall sections are coupled to the second vertical center wall to enclose a bowl-like structure within each interlocking half-section.

3. A plant protector according to claim 2 wherein a plurality of drain holes are formed in said bottom wall.

4. A plant protector according to claim 2 wherein said second vertical center wall extends upward from the bottom wall portion a greater distance than the pair of first center wall sections extend upward from the bottom wall portion.

5. A plant protector according to claim 4 wherein said bottom wall is generally planar and wherein a circular bottom edge of the outer portion of the circular outer wall extends slightly below said plane of said bottom wall.

6. A plant protector according to claim 5 molded from a durable, non-toxic plastic material.

\* \* \* \* \*